United States Patent

Skinner et al.

[11] Patent Number: 6,092,424
[45] Date of Patent: Jul. 25, 2000

[54] PRESSURE SENSOR FOR A BAGHOUSE

[75] Inventors: Kennith John Skinner; Forres Leonard McPheat, both of Auckland, New Zealand

[73] Assignee: Filtercorp International Ltd., Beachhaven, New Zealand

[21] Appl. No.: 08/613,919

[22] Filed: Mar. 11, 1996

Related U.S. Application Data

[63] Continuation of application No. 08/354,538, Dec. 13, 1994.

[51] Int. Cl.[7] .............................. G01L 13/02; G01L 15/00
[52] U.S. Cl. ........................................................... 73/716
[58] Field of Search .......................... 73/719, 720, 725, 73/726, 715, 729.1, 731; 55/274, 341.6; 95/21

[56] References Cited

U.S. PATENT DOCUMENTS

| | | | |
|---|---|---|---|
| 2,541,256 | 3/1951 | Ingham | 73/715 X |
| 2,737,051 | 3/1956 | Sanderson | 73/729.1 X |
| 3,461,416 | 8/1969 | Kaufman | 73/726 X |
| 3,956,920 | 5/1976 | Kollmeyer | 73/725 |
| 4,309,908 | 1/1982 | Rapp et al. | 73/720 |
| 4,529,422 | 7/1985 | Phillips | 55/274 X |
| 4,751,501 | 6/1988 | Gut | 55/274 X |
| 5,017,200 | 5/1991 | Price et al. | 55/341.6 X |
| 5,074,896 | 12/1991 | Baert et al. | 55/341.6 |

FOREIGN PATENT DOCUMENTS

| | | | |
|---|---|---|---|
| 616943 | 3/1961 | Canada | 73/729.1 |
| 133648 | 7/1947 | Netherlands | 73/731 |

*Primary Examiner*—William Oen
*Attorney, Agent, or Firm*—Gary L. Bush; Mayor, Day, Caldwell & Keeton LLP.

[57] ABSTRACT

A pressure transducer, particularly a transducer for measuring gaseous pressure differential across a chamber wall is disclosed. The transducer finds particular application in an air cleaning system. The pressure transducer of the invention is designed and arranged to include a load cell disposed between the chamber wall and a diaphragm which is designed and arranged to seal about a hole in the chamber wall.

6 Claims, 1 Drawing Sheet

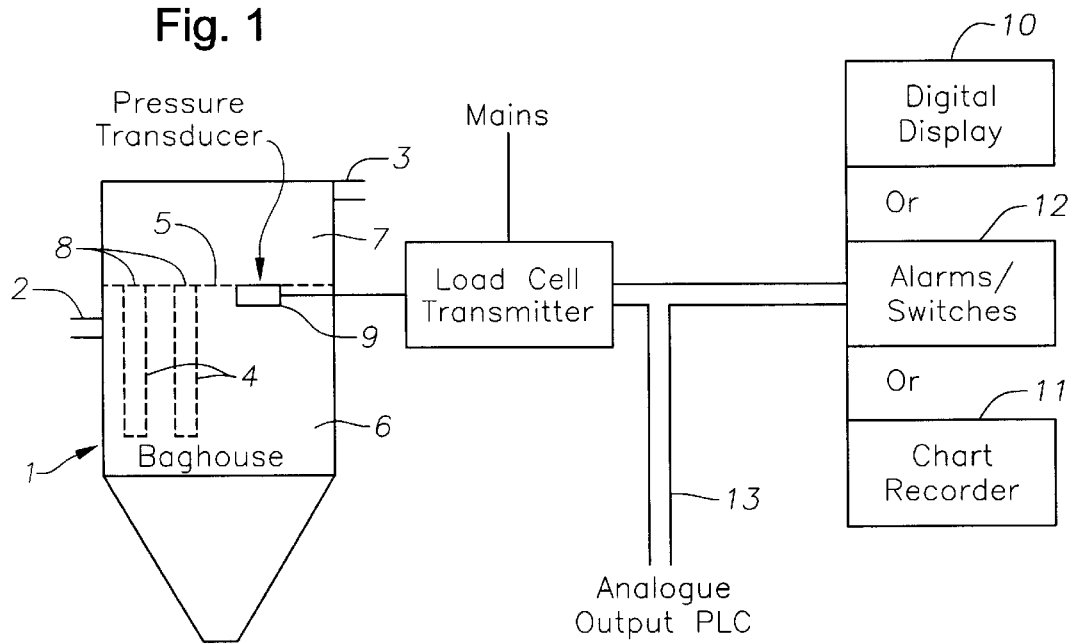
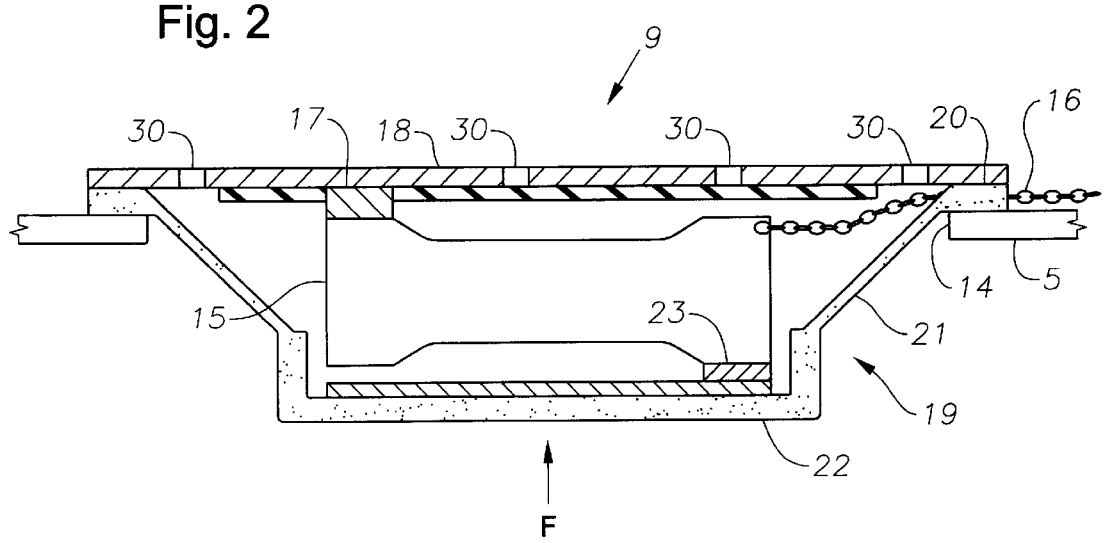

PRESSURE SENSOR FOR A BAGHOUSE

This application is a continuation of application Ser. No. 08/354,538 filed Dec. 13, 1994.

BACKGROUND OF THE INVENTION

1. Field of the Invention

This invention relates to pressure transducers and in particular to a transducer for measuring gaseous pressure differential across a chamber wall. The pressure transducer described has particular application in air cleaning systems.

2. Description of Prior Art

A common form of air cleaning system forces dust-laden air through filter bags fabricated from a material such that dust intended to be removed builds up on one surface of each bag. A multiplicity of bags may be used together in parallel and suspended from apertures in a dividing wall or cell plate within a purpose-designed vessel. Such a system is known as a "baghouse".

It is known to monitor the pressure differential across the filter bags to provide an indication of the state of the filter bags and thus initiate manual or automatic bag cleaning. The pressure differential arises due to frictional and kinetic energy losses through each bag. Conventional systems use a water manometer with sensing tubes connected into the vessel either side of the cell plate. Electronic pressure transducers have also been proposed but, as with the U-tube manometer, require coupling hoses and sensing ports open to the interior of the cell.

These conventional pressure indicators suffer from the disadvantage that the transducer connection on the dusty air side of the cell fills with contaminants to cause erroneous pressure differential readings. Clogged manometer ports either give a false indication of dust build-up on the filter bags, or cause early indications of filter problems to be missed.

3. Identification of Object of the Invention

It is therefore an object of the present invention to provide a gaseous pressure transducer which will at least go some way towards overcoming the above mentioned disadvantage or which will at least provide the industry with a useful choice.

SUMMARY OF THE INVENTION

Accordingly, in one aspect the invention may broadly be said to consist in a pressure transducer for measuring gaseous pressure differential across a wall having an electrical output which changes as a function of said pressure differential comprising:

a diaphragm adapted to be sealably mounted over an aperture in the wall, a load cell having first and second load points, with the first load point of the load cell fixed to the diaphragm, and coupling means which rigidly connect the second load point of the load cell to the wall, the output nodes of said load cell forming the output nodes of the transducer.

Preferably the diaphragm is shaped as a conical section with a perforated plate attached at its periphery to the periphery of the diaphragm, and the load cell is disposed between said diaphragm and said plate.

In a second aspect, the invention may broadly be said to consist in an air cleaning system comprising a vessel having a dividing wall which forms two chambers within the vessel, with the dividing wall including one or more apertures therethrough, one or more dust filter bags sealably suspended from a corresponding dividing wall aperture and a pressure transducer for measuring the pressure differential across the dividing wall to provide an electrical output which changes as a function of the pressure differential, with the pressure transducer in turn comprising;

a diaphragm adapted to be sealably mounted over an aperture in the wall, a load cell having first and second load points, with the first load point of the load cell fixed to said diaphragm, and coupling means which rigidly connect the second load point of the load cell to the wall, where the output nodes of the load cell form the output nodes of the transducer.

BRIEF DESCRIPTION OF DRAWING

The preferred form of the present invention will now be described with reference to the accompanying drawing in which:

FIG. 1 shows a diagrammatic representation of a dust extraction system and associated pressure differential monitoring; and FIG. 2 is a cross-section of a pressure transducer according to the present invention.

DESCRIPTION OF THE INVENTION

FIG. 1 shows a baghouse dust extraction system for dust-laden air with which the pressure transducer of the present invention is used. A cell or vessel 1 having an outer wall receives dust-laden air through port 2 and discharges clean air through port 3. Dust entrained within the incoming air is filtered out by being passed through a number of filter bags which share the total air flow. The filter bags are suspended from an inner transverse cell plate 5 which divides cell 1 into a dusty air side 6 and a clean air side 7. Filter bags 4 are suspended from corresponding apertures 8 uniformly dispersed across cell plate 5. Air passes through the filter bags leaving dust on the exterior surface of the bags and the clean air passes up through apertures 8 to be extracted through port 3.

A pressure transducer 9 monitors the pressure differential across cell plate 5 and then across the parallel arrangement of filter bags. As the dust on the filter bags 4 builds up, so too does the pressure differential across cell plate 5. This is monitored by pressure transducer 9 and a signal from the pressure transducer drives a digital display 10 which indicates pressure drop and may also drive a chart recorder 11 and/or an alarm 12. The analogue output 13 from the pressure transducer may be used to control a filter bag cleaning system such as pulsed compressed air jets directed into the filter bags from the top of cell 1.

The construction of pressure transducer 9 is shown in FIG. 2. It is shown mounted in an aperture 14 in cell plate 5. The primary sensing element of the transducer is a load cell 15 which, when provided with a suitable electrical input signal, provides an electrical output via lead conductors 16 representative of the force applied to the load points of the load cell. The load cell is mounted rigidly to cell plate 5 through load point 17 which is fixed to a perforated cover 18. Perforations or holes 30 are provided in plate 18. Cover 18 extends beyond the periphery of aperture 14 and is bolted or otherwise fixed to the cell plate across aperture 14.

A flexible diaphragm 19, which may be made for example from rubber or a plastics material, is fixed to transducer cover 18 about its periphery 20 and in sealing engagement with the rim of aperture 14. Cover 18 is preferably bonded with silicone to the periphery 20 of diaphragm 19. Diaphragm 19 thus is subject to the same pressure differential as is cell plate 5. This is because cover 18 is perforated with holes 30, allowing the upper surface of diaphragm 19 to be subject to the same pressure as applies to the clean air side of cell plate 5.

Diaphragm 19 comprises a concial portion 21 and a base portion 22. Base portion 22 is fixed to the second load point 23 of load cell 15. Thus a force F applied to diaphragm 19 in the direction of the arrow will be transmitted to load cell load point 23, and because load point 17 is fixed, load cell 15 provides an electrical output proportional to force F. In the application described, force F is produced by the pressure differential between the dusty air and clean air sides of cell plate 5. The output of load cell 15 is therefore proportional to the pressure differential across the filter bags 4.

The leads 16 may run through via one of the holes 30 to a terminal enclosure (not illustrated) mounted on plate 18.

A cantilever type load cell has been shown, but other configurations could be used to provide similar results. It is preferred that the load cell be physically small since there are advantages in providing a pressure transducer which is of relatively small total size. The load cell should have a capacity less than 5 kg in order to provide sufficient accuracy at the pressure differentials normally experienced in the application described. An example of a suitable load cell is a Tanaka model C2G1 series load cell manufactured by EMC. It will be appreciated that this load cell is given by way of example only.

The present transducer has the advantage that no tubes or ports are required which can be contaminated. The diaphragm protects the transducer from dust as a natural consequence of its structure and function and the perforations in cover 18 may be provided with filters to prevent what little dust may enter the clean air plenum from entering the interior of the transducer. The only connections required between the transducer and the external measuring system are the electrical conductors from the load cell.

What is claimed is:

1. A transducer for measuring pressure differential comprising, a cover member (18) having an outer annular portion arranged and designed for sealable securement beyond the periphery of a hole in a wall, where differential fluid pressure exists on opposite sides of a wall, a diaphragm (19) sealed about and carried by a portion of said cover member (18), said diaphragm having outer and inner surfaces and arranged and designed such that said outer surface may be exposed only to fluid pressure on one side of a wall, a load cell (15) having first (17) and second (23) load points, said first load point (17) secured to said cover member (18), said second load point (23) secured to said diaphragm (19), a fluid passage (18) in said cover member (18) arranged and designed so that fluid pressure on an opposite side of a wall may be applied to said inner surface of said diaphragm, but not to said outer surface of said diaphragm, said load cell having output leads (18) for producing an electrical output signal which changes as a function of pressure differential between said inner and outer surfaces of said diaphragm.

2. The transducer of claim 1 wherein, said cover member (18) is a plate, and said plate is perforated so that one or more passages exist from outside said plate to its inside so that fluid pressure may be applied to said inner surface of said diaphragm.

3. The transducer of claim 1 wherein said diaphragm (19) is sealed and carried by said annular portion of said cover member (18).

4. The transducer of claim 7 wherein said diaphragm (19) includes a conical section having an outer annular portion which is sealed to and carried by said annular portion of said cover member.

5. In an air cleaning system having a vessel with a lower inlet chamber for dust entrained air and an upper outlet chamber for relatively dust-free air, an inner transverse wall between said chambers having a plurality of apertures therein, and a plurality of filter bags suspended from said transverse wall and received within said apertures; an improved pressure transducer for measuring fluid pressure differential between said lower and upper chambers comprising:

a diaphragm having inner and outer sides and designed and arranged to be sealably mounted within an opening of a wall of said lower inlet chamber and having its inner side in gaseous communication with said lower inlet chamber, said diaphragm being secured and sealed at its outer periphery with respect to said wall;

a plate across said opening and across said diaphragm and secured at its outer periphery to said wall;

a load cell having first and second load points, said first load point being secured to said diaphragm and said second load point being secured to said plate;

a fluid passage for communication of fluid pressure to said outer side of said diaphragm from said upper outlet chamber, and output leads connected to said load cell for producing an electrical output signal which changes as a function of gaseous pressure differential between said lower and upper chambers.

6. In an air cleaning system as set forth in claim 5 wherein:

said pressure transducer is mounted within an opening of said inner transverse wall, and said fluid passage is an opening in said plate which provides gaseous communication between said upper outlet chamber for clean filtered air and said outer side of said diaphragm which faces dust entrained air.

* * * * *